United States Patent
Al-Helal et al.

(10) Patent No.: US 12,252,440 B2
(45) Date of Patent: *Mar. 18, 2025

(54) RECYCLED CONCRETE AGGREGATES AND HEAVY OIL FUEL ASH FOR GREEN CONTROLLED LOW STRENGTH MATERIAL

(71) Applicants: SAUDI ARABIAN OIL COMPANY, Dhahran (SA); King Fahd University of Petroleum & Minerals, Dhahran (SA)

(72) Inventors: Zakariya Saleh Al-Helal, Dhahran (SA); Muhammad Kalimur Rahman, Dhahran (SA); Carlos Ernesto Acero, Dhahran (SA); Mohammed Ibrahim, Dhahran (SA); Luai M. Alhems, Dhahran (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 416 days.

This patent is subject to a terminal disclaimer.

(21) Appl. No.: 17/862,198

(22) Filed: Jul. 11, 2022

(65) Prior Publication Data
US 2022/0340490 A1    Oct. 27, 2022

Related U.S. Application Data

(63) Continuation-in-part of application No. 16/815,805, filed on Mar. 11, 2020, now Pat. No. 11,434,168.

(60) Provisional application No. 62/816,602, filed on Mar. 11, 2019.

(51) Int. Cl.
C04B 18/167    (2023.01)
C04B 18/06    (2006.01)

(52) U.S. Cl.
CPC ............ *C04B 18/167* (2013.01); *C04B 18/06* (2013.01)

(58) Field of Classification Search
CPC ....... C04B 18/167; C04B 18/06; C04B 28/04; Y02W 30/91
See application file for complete search history.

(56) References Cited

U.S. PATENT DOCUMENTS

| | | | |
|---|---|---|---|
| 6,821,336 B1 | 11/2004 | Ramme et al. | |
| 7,390,444 B2 | 6/2008 | Ramme et al. | |
| 8,444,761 B2 | 5/2013 | Al-Mehthel et al. | |
| 8,945,300 B2 | 2/2015 | Al-Mehthel et al. | |
| 9,150,455 B2 | 10/2015 | Al-Mehthel et al. | |
| 9,249,304 B2 | 2/2016 | Al-Mehthel et al. | |
| 11,078,117 B2 | 8/2021 | Nissinen et al. | |
| 11,434,168 B2 * | 9/2022 | Al-Helal | C04B 28/04 |
| 2002/0162484 A1 | 11/2002 | Ramme et al. | |
| 2011/0067601 A1 | 3/2011 | Fried | |
| 2013/0104779 A1 | 5/2013 | Al-Mehthel et al. | |
| 2013/0118382 A1 | 5/2013 | Al-Mehthel et al. | |
| 2015/0122148 A1 | 5/2015 | Wahhab et al. | |
| 2017/0283319 A1 | 10/2017 | Maslehuddin et al. | |
| 2018/0265405 A1 | 9/2018 | El Naggar et al. | |
| 2019/0284804 A1 | 9/2019 | Ibrahim et al. | |
| 2020/0102248 A1 | 4/2020 | Alkhatib et al. | |
| 2020/0290925 A1 | 9/2020 | Skocek et al. | |
| 2022/0348498 A1 * | 11/2022 | Acero | C04B 18/167 |

FOREIGN PATENT DOCUMENTS

| | | |
|---|---|---|
| BR | 102017027894 A2 | 7/2017 |
| CN | 1137496 A | 2/2004 |
| CN | 101157527 A | 4/2008 |
| CN | 102503191 A | 6/2012 |
| CN | 102701615 A | 10/2012 |
| CN | 104844111 A | 8/2015 |
| CN | 108203270 A | 6/2018 |
| CN | 108264292 A | 7/2018 |
| CN | 113045264 A | 6/2021 |
| IL | 105654 A | 6/1997 |
| IL | 115988 A | 9/1999 |
| KR | 100562594 B1 | 3/2006 |
| KR | 101115950 | 2/2012 |
| KR | 1014871790000 B1 | 1/2015 |
| KR | 101487179 B1 | 2/2015 |
| TW | I307335 B | 3/2009 |

OTHER PUBLICATIONS

Achtemichuk. et al., The utilization of recycled concrete aggregate to producecontrolled low-strength materials without using portland cement. Cement & Concrete Composites 2009;31:564-9.

Al-Osta, et al., "Study Of Heavy Fuel Oil Fly Ash For Use In Concrete Blocks And Asphalt Concrete Mixes," Advances in Concrete Construction, vol. 4, Issue 2, 2016, pp. 123-143.

Benlamoudi, et al., "Incorporation of Alternative Fuels and Raw Materials (AFR) to Produce a Sustainable Cement," International Journal of Engineering & Technology, 7(4.30), 136-140 (2018).

Bernal, et al., "Management and Valorisation of Wastes Through Use in Producing Alkali-Activated Cement Materials," Journal of Chemical Technology and Biotechnology, 91 (9). pp. 2365-2388 (2016).

(Continued)

*Primary Examiner* — Anthony J Green
(74) *Attorney, Agent, or Firm* — Bracewell LLP; Constance G. Rhebergen; Eleanor T. Porter

(57) ABSTRACT

A controlled low strength material has constituents that include a cement, an aggregate, and a water. The aggregate includes concrete demolition waste. The controlled low strength material has a compressive strength that does not exceed 8.3 MPa, measured at 28 days. The controlled low strength material can alternately include a heavy oil fuel ash and the controlled low strength material can have a compressive strength that does not exceed 2.10 MPa, measured at 28 days.

18 Claims, 3 Drawing Sheets

(56) References Cited

OTHER PUBLICATIONS

Camilleri et al., "The Microstructure and Physical Properties of Heavy Oil Fuel Ash Replaced Portland Cement for Use in Flowable Fill Concrete and the Production of Concrete Masonry Units", Construction and Building Materials, vol. 38, 2013, pp. 970-979.
Dobiszewska, et al., "Investigating the Influence of Waste Basalt Powder on Selected Properties of Cement Paste and Mortar," IOP Conf. Ser.: Mater. Sci. Eng., 245, 2017.
Folliard, et al., "Development of a Recommended Practice for Use of Controlled Low-Strength Material in Highway Construction," National Academies of Sciences, Engineering, and Medicine, 2008, 150 pages.
Ibrahim et al., "A review on utilization of industrial by-products in the production of controlled low strength materials and factors influencing the properties", Construction and Building Materials, vol. 325, 2022, 126704.
International Search Report and Written Opinion for related PCT application PCT/US2020/021967 dated Jun. 15, 2020.
Kuo, et al., Engineering properties of controlled low-strength materials containing waste oyster shells. Construction and Building Materials 46, 128-133, 2013.
Liu, et al., "A Study on the Relationships between Water Film Thickness, Fresh Properties, and Mechanical Properties of Cement Paste Containing Superfine Basalt Powder (SB)," Materials, 14, 2021.
Mofarrah, et al., "Investigation of the Potential Use of Heavy Oil Fly Ash as Stabilized Fill Material for Construction," Journal of Materials in Civil Engineering, vol. 24, No. 6, pp. 684-690, 2012.
N. Rajendran, "Controlled Low Strength Materials (CLSM)," American Concrete Institute, Committee 229, ACI 229R-94 Report, 1994.
Paya et al., "Properties of Portland cement mortars incorporating high amounts of oil-fuel ashes", Waste Management, 1999, pp. 7.
Ponzi, et al.,"Basalt Powder as a Supplementary Cementitious Material in Cement Paste for CCS Wells: Chemical and Mechanical Resistance of Cement Formulations for CO2 Geological Storage Sites," International Journal of Greenhouse Gas Control, 109 (2021).
Qiao, et al., "The Feasibility of Basalt Rock Powder and Superfine Sand as Partial Replacement Materials for Portland Cement and Artificial Sand in Cement Mortar," Research and Application of Materials Science, 1:1 (2019).
Tangchirapat et al., "Use Of Ground Palm Oil Fuel Ash to Improve Strength, Sulfate Resistance, And Water Permeability of Concrete Containing High Amount Of Recycled Concrete Aggregates", Materials & Design, vol. 41, 2012, p. 150-157.
Trejo, et al., "Sustainable development using controlled low-strength material," International Workshop on Sustainable Development and Concrete Technology, Jan. 2004, pp. 231-250.
Zhang et al., "Rapid-Hardening Controlled Low Strength Materials Made of Recycled Fine Aggregate from Construction and Demolition Waste", Construction and Building Materials, vol. 173, 2018, pp. 81-89.
Al-Malack, et al., Characteristics of Fly Ash Produced at Power and Water Desalination Plants Firing Fuel Oil, Int. J. Envir. Res., v. 7(2), Spring 2013, pp. 455-466.
Do, et al., Development of a New Cementless Binder for Controlled Low Strength Material (CLSM) Using Entirely By-products, Construction and Building Materials 206 (2019), pp. 576-589.
Folliard, et al., Development of a Recommended Practice for Use of Controlled Low-Strength Material in Highway Construction (2008), National Academies Sciences Engineering Medicine, NCHRP Report 597, 151 pgs.
Katz, et al., Properties of Concrete Made with Recycled Aggregates from Partially Hydrated Old Concrete, Cement and Concrete Research, vol. 33, No. 5, pp. 703-711, May 2003.
Katz, et al., Utilization of Industrial By-Products for the Production of Controlled Low-Strength Materials, Waste Management (Oxford) 2004; 24:501-512.

\* cited by examiner

RECYCLED CONCRETE AGGREGATES AND HEAVY OIL FUEL ASH FOR GREEN CONTROLLED LOW STRENGTH MATERIAL

CROSS REFERENCE TO RELATED APPLICATION

This application is a continuation in part of, and claims priority to and the benefit of, co-pending U.S. application Ser. No. 16/815,805 filed Mar. 11, 2020, titled "Utilization Of Heavy Oil Fly Ash To Produce Controlled Low Strength Material For Backfilling Applications," now U.S. Pat. No. 11,434,168, issued Sep. 6, 2022, which claims priority to and the benefit of U.S. Provisional Application Ser. No. 62/816,602, filed Mar. 11, 2019, titled "Utilization Of Heavy Oil Fly Ash To Produce Controlled Low Strength Material For Backfilling Applications," the full disclosures of each which is hereby incorporated herein by reference in its entirety for all purposes.

BACKGROUND OF THE DISCLOSURE

Field of the Disclosure

The present disclosure relates to a controlled low strength material to be used as backfilling material in construction. More specifically, the disclosure relates to a controlled low strength material having heavy oil fuel ash and recycled concrete demolition waste and methods for making the same.

Description of the Related Art

Large quantities of heavy oil fuel ash (HOFA) is generated as a byproduct or waste material by power generation and desalination plants. In view of the environmental protection policies that limit the release of such waste materials to the atmosphere, as a result of this the amount of heavy oil fuel ash generated by these facilities will increase, posing a progressively greater challenge for the handling and disposing of heavy oil fuel ash.

A large quantity of concrete demolition wastes (CDW) are generated in major cities around the world as the old concrete structures whose service life has exhausted are demolished to give way for newer and modern structures. Disposal of concrete demolition wastes is a major problem worldwide. A large portion of concrete demolition wastes can be recycled by crushing to generate coarse and fine aggregates of various sizes. Such aggregates formed from concrete demolition wastes can be known as recycled concrete aggregates.

Controlled low strength material is a self-compacted, cementitious material primarily used as a backfill in lieu of compacted backfill. The qualities that make controlled low strength material a desirable engineered material are the ability to self-consolidate or self-compact in a fresh state and the ability to be excavated after hardening.

Although controlled low strength material can be designed and produced in a similar way to concrete, there are substantial differences between controlled low strength material and concrete. Concrete is designed to resist large stresses in compression. In reinforced concrete structures including bridges, buildings, tunnels, marine structures and others, the concrete can have a compressive strength in a range of 14 MPa to 50 MPa or higher. Typically, the durability of concrete is affected by the ability to protect the reinforcing steel from corrosion. Therefore it is desirable for concrete to have high density and low permeability. Concrete provides a dense, impermeable and durable mass, which is required to achieve the desirable service life which can be in excess of 50 years.

On the other hand, controlled low strength material (CLSM) is mainly used as a substitute for a strong soil and the ability to later excavate the controlled low strength material is an important parameter. This CLSM is generally referred to as "Excavatable CLSM". The compressive strength of the excavatable CLSM material should not typically exceed 300 KPa to 2.10 MPa. The CLSM can also be used for permanent applications such as under the isolated or raft foundations, wherein, it can be called as "Non-excavatable CLSM" with compressive strength in a range from 2.10 MPa to 8.3 MPa.

CLSM can be an excavatable, initially fluid, self-leveling material. There are several potential applications of CLSM including; backfilling utility trenches, filling abandoned underground structures and backfilling bridge abutments and retaining walls, structural fills, insulating and isolation fills, thermal-insulation-conductivity fills, pavement bases, conduit bedding, utility trenches, road subgrade, erosion control, foundations, and pipeline excavations, pipe bedding materials, and nuclear facilities.

It is important to have a highly flowable CLSM mix without any segregation and bleeding, so that the CLSM can penetrate into small cavities and corners. The maximum aggregate size in CLSM is generally limited to less than 10 mm diameter. In most applications CLSM has aggregates less than 4.76 mm diameter. Also because there is no reinforcement of any type in controlled low strength material, the permeability is not a critical feature of the controlled low strength material.

SUMMARY OF THE DISCLOSURE

Embodiments of this disclosure provide a controlled low strength material formed with heavy oil fuel ash and recycled concrete aggregates obtained from concrete demolition wastes. The heavy oil fuel ash can be combined with cement, aggregates obtained from concrete demolition wastes, and water to produce the controlled low strength material to be used as soil backfill for cavities or trenches without the need for compaction or added consolidation.

The controlled low strength material of this disclosure can provide the flowability needed for easy placement of the controlled low strength material and the controlled low strength material will set, or settle, at least as quickly as currently available controlled low strength material that is formed with Portland cement. Further, the controlled low strength material will maintain a low strength in the long term. A low strength in the long term is important for being able to later excavate the controlled low strength material and this type of controlled low strength material is generally referred to as "Excavatable CLSM". A controlled low strength material with a somewhat greater strength can be a "Non-Excavatable CLSM."

In an embodiment of the disclosure, a controlled low strength material has constituents that include a cement, an aggregate, where the aggregate includes concrete demolition waste, and a water. The controlled low strength material has a compressive strength that does not exceed 8.3 MPa, measured at 28 days.

In alternate embodiments, the controlled low strength material can further include a heavy oil fuel ash, where the controlled low strength material can have a compressive strength that does not exceed 2.10 MPa, measured at 28 days. The heavy oil fuel ash can include carbon in an amount of 90 wt % to 95 wt % based on a weight of heavy oil fuel ash. At least 80% of the heavy oil fuel ash can have a particle size smaller than 45 micrometers.

In other alternate embodiments, the constituents of the controlled low strength material can include: the cement in an amount of 2 wt % to 5 wt % of the constituents of the controlled low strength material; the aggregate in an amount of 20 wt % to 95 wt % of the constituents of the controlled low strength material; the heavy oil fuel ash in an amount of 10 wt % to 50 wt % of the sum of the cement and the heavy oil fuel ash; and the water in an amount of 10 wt % to 20 wt % of the constituents of the controlled low strength material.

In still other alternate embodiments, an amount of aggregate with a particle size greater than 9.5 mm can be 10% or less of the amount of aggregate. The aggregate can include a fine aggregate formed of a concrete demolition waste that has a particle size less than 4.75 mm, and a coarse aggregate. The aggregate can include a fine aggregate formed of a concrete demolition waste that has a particle size less than 4.75 mm, and a coarse aggregate formed of a concrete demolition waste that has a particle size larger than 5 mm. The coarse aggregate can have a particle size of up to 19 mm.

In an alternate embodiment of this disclosure, a method for forming a controlled low strength material includes mixing together constituents that include: a cement; an aggregate, where the aggregate includes concrete demolition waste; and a water. After mixing, the controlled low strength material has a compressive strength that does not exceed 8.3 MPa, measured at 28 days.

In alternate embodiments, the constituents can further include a heavy oil fuel ash, such that after mixing, the controlled low strength material has a compressive strength that does not exceed 2.10 MPa, measured at 28 days. The heavy oil fuel ash can include carbon in an amount of 90 wt % to 95 wt % based on a weight of heavy oil fuel ash. At least 80% of the heavy oil fuel ash can have a particle size smaller than 45 micrometers.

In other alternate embodiments, the constituents of the controlled low strength material can include: the cement in an amount of 2 wt % to 5 wt % of the constituents of the controlled low strength material; the aggregate in an amount of 20 wt % to 95 wt % of the constituents of the controlled low strength material; the heavy oil fuel ash in an amount of 10 wt % to 50 wt % of the sum of the cement and the heavy oil fuel ash; and the water in an amount of 10 wt % to 20 wt % of the constituents of the controlled low strength material.

In still other alternate embodiments, an amount of aggregate with a particle size greater than 9.5 mm can be 10% or less of the amount of aggregate. The aggregate can include a fine aggregate formed of a concrete demolition waste that has a particle size less than 4.75 mm, and a coarse aggregate. Alternately, the aggregate can include a fine aggregate formed of a concrete demolition waste that has a particle size less than 4.75 mm, and a coarse aggregate formed of a concrete demolition waste that has a particle size larger than 5 mm. The coarse aggregate can have a particle size of up to 19 mm. The heavy oil fuel ash can be part of a heavy oil fuel ash slurry that includes the heavy oil fuel ash and a slurry water, the method further including adding the heavy oil fuel ash slurry directly to the cement and the aggregate to produce the controlled low strength material. The slurry water and the mixing water together can be in an amount of 10 wt % to 20 wt % of the constituents of the controlled low strength material.

BRIEF DESCRIPTION OF THE DRAWINGS

So that the manner in which the above-recited features, aspects, and advantages of the disclosure, as well as others that will become apparent, are attained, and can be understood in detail, a more particular description of the embodiments of the disclosure briefly summarized above may be had by reference to the embodiments thereof that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION OF THE DISCLOSURE

Figure 1:
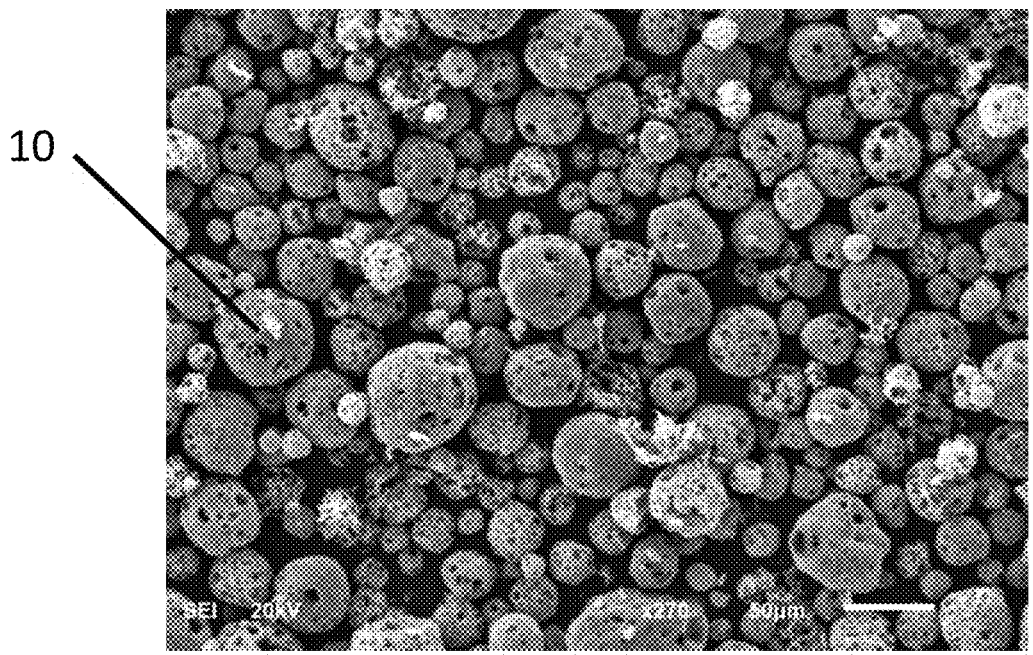
FIG. 1 is a scanning electron microscopy of an example of a heavy oil fuel ash, in accordance with an embodiment of this disclosure, shown at a ×270 magnification and a scale of 50 μm.

The disclosure refers to particular features, including process or method steps. Those of skill in the art understand that the disclosure is not limited to or by the description of embodiments given in the specification.

Those of skill in the art also understand that the terminology used for describing particular embodiments does not limit the scope or breadth of the embodiments of the disclosure. In interpreting the specification and appended claims, all terms should be interpreted in the broadest possible manner consistent with the context of each term. All technical and scientific terms used in the specification and appended claims have the same meaning as commonly understood by one of ordinary skill in the art to which this disclosure belongs unless defined otherwise.

As used in the Specification and appended claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components, or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended claims to a method comprising two or more defined steps, the defined steps can be carried out in any order or simultaneously except where the context excludes that possibility.

According to embodiments of this disclosure, a controlled low strength material can be formed that includes a cement, an aggregate, a heavy oil fuel ash, and a water. Each of the constituents are further described in this disclosure.

Cement

Cement is a binder that can bind the aggregate together. Ordinary Portland cement is an example of a binder that can bind to other materials, such as aggregates, thereby holding them together. A material that is a paste that can harden to bind materials together, in the manner of cement, is said to be a cementitious material or to have cementitious properties. The cement of embodiments of this disclosure can be, for example, a Type I or a Type-V Portland Cement as classified by the American Society for Testing and Materials (ASTM) such as in ASTM C150. However, any type of cement, including a pozzolanic cement, can be used to produce the controlled low strength material of this disclosure, as long as the cement is certified for compliance to an international accepted material standard.

Heavy Oil Fuel Ash

Heavy oil fuel ash, which is also referred to as heavy oil fly ash, is a residue resulting from the combustion of heavy oil or cracked oil. Heavy oil is generally defined as fuel oil having relatively long hydrocarbon chains such as, for example, carbon lengths of between about 12-70 carbon atoms or between about 20-70 carbon atoms. Due to its high viscosity, heavy fuel oil is sometimes preheated before combustion in, for example, a power generation plant.

Cracking, in the oil refining industry, generally refers to breaking down complex organic molecules into simpler molecules by breaking the long-chain hydrocarbons into shorter hydrocarbon chains. Various processes can be used to crack oil including, for example, catalytic processes. After the cracking process, the resultant hydrocarbons can be separated into various types of fuel, including, for example, fuel gas, liquefied petroleum gas, gasoline, light cycle oils, and heavy fuel oil. The heavy fuel oil produced by the cracking process can be referred to as "cracked fuel oil." For purposes of this application, cracked fuel oil and heavy fuel oil are both referred to as a heavy oil, unless otherwise specified. Electricity production plants and water desalination plants can use heavy oil. An increase in the resulting heavy oil ash is expected due to additional environmental restrictions. Combustion of heavy oil produces residue, including heavy oil fuel ash. The heavy oil fuel ash can, and to some extent must, due to environmental restrictions, be captured rather than being released into the atmosphere.

Heavy oil fuel ash is a black powder type of waste material that results from burning of heavy oil. Heavy oil fuel ash has unique characteristics compared to other types of ash. Heavy oil fuel ash is collected in the electrostatic precipitators, which are installed on boilers burning residual oil, for air pollution control. A current practice for the disposal of heavy oil fuel ash is to bury the heavy oil fuel ash in special lined and sealed pits which is very costly and requires large area to be reserved as dumping sites.

Heavy oil fuel ash can include various particle sizes. In an embodiment of this disclosure, no more than 20% by weight of the heavy oil fuel ash is retained on a #325 sieve, while at least 80% by weight of the material passes through the #325 sieve. This indicates that at least 80% by weight of the heavy oil fuel ash can be finer than about 45 micrometers (microns).

Typically, heavy oil fuel ash includes more than about 90% by weight carbon. The remaining less than about 10% by weight of the heavy oil fuel ash can contain various elements. For example, Table 1 presents an example chemical analysis of a heavy oil fuel ash. The amounts of each element can vary depending upon the source of the heavy oil fuel ash.

TABLE 1

Elemental Composition of Example Embodiment of Heavy oil fuel Ash

| Element | Weight, % (Range) |
|---|---|
| Carbon | 90-95 |
| Sulfur | 4-7 |
| Copper | 1-3 |

In embodiments of this disclosure, the heavy oil fuel ash can include carbon in an amount of 90 wt % to 95 wt % based on the weight of heavy oil fuel ash. At least 80% of the heavy oil fuel ash can have a particle size smaller than 45 micrometers.

Table 2 presents an example physical properties of heavy oil fuel ash. The properties can vary depending upon the source of the heavy oil fuel ash.

TABLE 2

| Property | Values (Avg) |
|---|---|
| Bulk density by gas | 0.34 g/cm$^3$ |
| Bulk density by water | 1.67 g/cm$^3$ |
| True density by water | 1.98 g/cm$^3$ |
| Specific gravity | 0.34 |
| Grain size | 63.09 µm |
| Porosity by helium gas | 82.85% |
| Porosity by water | 22.03% |
| Moisture content | 0.9% |
| Loss on Ignition (LoI) | 95.2% |
| Ash content | 4.8% |

Table 3 presents example maximum concentrations of certain elements of heavy oil fuel ash. The amounts can vary depending upon the source of the heavy oil fuel ash.

TABLE 3

| Parameter | Value (mg/kg) |
|---|---|
| Silver | <10 |
| Aluminum | 406.2 |
| Arsenic | 2.90 |
| Barium | 14.65 |
| Calcium | 736.7 |
| Cadmium | 3.58 |
| Cobalt | 6.95 |
| Chromium | 63.88 |
| Copper | 17.58 |
| Iron | 20225 |
| Magnesium | 12622 |
| Manganese | 48.84 |
| Sodium | 1689 |
| Nickel | 4334 |
| Lead | 26.70 |

TABLE 3-continued

| Parameter | Value (mg/kg) |
|---|---|
| Selenium | <1.0 |
| Vanadium | 15619 |
| Zinc | 34.19 |

Table 4 presents an example compound composition and other characteristics of heavy oil fuel ash. The amounts of each compound can vary depending upon the source of the heavy oil fuel ash.

TABLE 4

Compound Composition and Characteristics of Example Embodiment of Heavy oil fuel Ash

| Parameter | Weight, % (Range of Values) |
|---|---|
| $SiO_2$ | 1-2 |
| CaO | 0.4-1.0 |
| $Al_2O_3$ | <0.10 |
| $Fe_2O_3$ | 0.4-0.5 |
| MgO | 0.4-0.6 |
| $K_2O$ | 0.01-0.04 |
| $Na_2O$ | 0.5-1.0 |
| $V_2O5$ | 2.0-3.0 |
| Sulfur | 2-6 |
| $Na_2O + (0.658\ K_2O)$, % | 0.3-0.6 |
| Loss on ignition | 90-95 |
| Moisture % | 1-2 |
| Fineness (Material retained on # 325 sieve) | 10-20 |

The elemental and compound composition of the heavy oil fuel ash used in embodiments of the present disclosure is substantially different from that of traditional fly ash.

Unlike heavy oil fuel ash, traditional fly ash is generally produced by burning coal. The main chemical components of the traditional fly ash are silicon dioxide (SiO2), calcium oxide (CaO), aluminum oxide (Al2O3), and iron oxide (Fe2O3) and is in accordance with ASTM C618. Traditional fly ash is generally categorized depending on the type of coal burned. For example, class F fly ash is produced by burning anthracite and bituminous coal, while Class C fly ash is produced by burning lignite or sub-bituminous coal. Since traditional fly ash contains substantial amounts of silica, traditional fly ash reacts with calcium hydroxide, or lime, during the hydration of cement, making the cement dense and impermeable. As an example, a coal ash can contain 46.6 wt % CaO, 33.8 wt % SiO2 and 14.8 wt % SO4, based on the weight of traditional coal ash. With such amounts of CaO, SiO2, and SO4 there is only 4.8 wt % of any other compound in the traditional coal ash. Therefore such traditional coal ash could not contain at least 90 wt % carbon.

Embodiments of this disclosure are free of traditional fly ash. Because heavy oil fuel ash contains at least 90 wt % carbon, heavy oil fuel ash does not contribute to the formation of supplementary cement and is considered essentially non-cementitious.

The morphology of an example heavy oil fuel ash was evaluated utilizing scanning electron microscopy (SEM) and energy dispersive spectroscopy (EDS) analysis using a JEOL scanning electron microscope fitted with an energy dispersive X-ray analyzer model 5800 LV.

Figure 2:
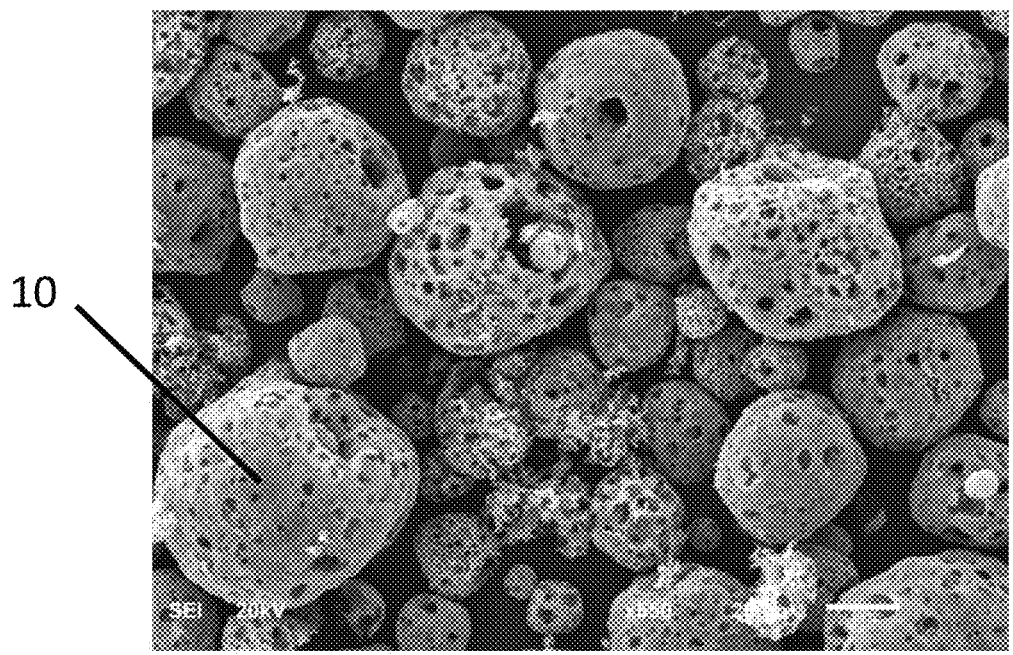
FIG. 2 is a scanning electron microscopy of an example of a heavy oil fuel ash, in accordance with an embodiment of this disclosure, shown at a ×550 magnification of and a scale of 20 μm.

Looking at FIG. 1, an SEM image of heavy oil fuel ash is shown at ×270 magnification and a scale of 50 μm. Looking at FIG. 2, an SEM image of heavy oil fuel ash is shown at ×550 magnification and a scale of 20 μm. The heavy oil fuel ash was composed of a variety of particles 10 which can be seen in FIGS. 1-2. The particles 10 of heavy oil fuel ash were spherical in shape. SEM indicates that the surface of the heavy oil fuel ash particles 10 is porous.

Looking at Table 5, results of the EDS analysis are shown. Measurements were made in five spots of a test sample. The results of the EDS analysis show the existence of unburned carbon (C) in higher proportions, in a range of 92-95%.

The high percentage of carbon content in the heavy oil fuel ash was also confirmed by the loss-on-ignition test which gave a result of 90-95% carbon content, as shown in Table 5. Low quantities of Sulphur (S) in a range or 5-5.5% and Copper (Cu) in a range of 2.4 to 2.6% can be noted. Broad spectrum EDS analysis demonstrated the main elemental peak of carbon accompanied by smaller peaks of other trace elements including magnesium (Mg), nickel (Ni), aluminum (Al), iron (Fe), sodium (Na), calcium (Ca) and Tantalum (Ta)

TABLE 5

| | Element Weight, % | | | | | |
|---|---|---|---|---|---|---|
| Element | Spot 1 | Spot 2 | Spot 3 | Spot 4 | Spot 5 | Avg. |
| C | 92.5 | 92.1 | 92.4 | 92.5 | 94.6 | 92.8 |
| S | 5.0 | 5.6 | 5.1 | 4.9 | 5.4 | 5.2 |
| Cu | 2.6 | 2.4 | 2.5 | 2.6 | 2.5 | 2.5 |

Water

Water can be added to dry cement to make cement paste. The water-cement ratio ("w/c ratio") of a typical Portland cement can be between about 0.20 and 0.50. By way of explanation, a w/c ratio of 0.20 indicates that there is one part water to five parts Portland cement (1/5=0.20). A w/c ratio of 0.50 indicates one part water to two parts cement. Embodiments of this disclosure include a w/c ratio in a range of 1.0 and 3.0. The ratio of water and fine cementitious material will balance the strength and flowablility of the resulting controlled low strength material.

The water used to form the controlled low strength material can be fresh and free of oil and other contaminants, with foreign particles not exceeding the limits established for concrete mixing.

Water-Based Slurry of HOFA

Heavy oil fuel ash is a very fine material which is stored in thick bags. When exposed to air a certain percentage of heavy oil fuel ash tends to diffuse in the surrounding air and can remain suspended in air. Utilization of finely powdered heavy oil fuel ash for forming the controlled low strength material has the problem of dispersion in the surrounding air when added in the controlled low strength material mix.

Experimental investigations conducted showed that the heavy oil fuel ash could be stored in drums as a water-based slurry and the slurry could be added directly to the controlled low strength material mixes. This preserves the environment by precluding dispersion of fine heavy oil fuel ash powder in air. The percentage of water in the slurry could vary from 1% to 5% by weight of heavy oil fuel ash.

In an embodiment, the heavy oil fuel ash can be part of a slurry that is made by mixing an appropriate quantity of water with the fine heavy oil fuel ash. This heavy oil fuel ash slurry can be added directly to the cement, aggregate, and any additional required mixing water. By first pre-blending a heavy oil fuel ash slurry, the environmental hazard associated with the handling of dry ultrafine heavy oil fuel ash directly with the cement and aggregate can be reduced. The amount of water used to produce the heavy oil fuel ash slurry, can be added to the total amount of mixing water, used to form the controlled low strength material. In certain embodiment, the combined total of the slurry water and the mixing water can be in an amount of 10 wt % to 20 wt % of the constituents of the controlled low strength material, based on the weight of the controlled low strength material.

Aggregate

As one of ordinary skill will appreciate, various types of conventional aggregates can be used as a filler. The aggregates can include a course aggregate and a fine aggregate. The coarse aggregate can be a recycled concrete coarse aggregate alone, a natural coarse aggregate alone, or can be a mix of recycled concrete coarse aggregate and a natural coarse aggregate. The fine aggregate can be a recycled concrete fine aggregate alone, natural fine aggregate alone, or can be a mix of recycled concrete fine aggregate and a natural fine aggregate. In embodiments of this disclosure, at least some of the aggregate is a recycled concrete aggregate. That is, either the coarse aggregate includes a recycled concrete aggregate or the fine aggregate includes a recycled concrete aggregate, or both the coarse aggregate and the fine aggregate includes a recycled concrete aggregate.

Fine aggregates used in embodiments of this disclosure, also referred to as "fines," can include crushed concrete demolition wastes with particles smaller than 4.75 mm. The fine aggregates do not include the recycled concrete powder with most particles smaller than 0.074 mm passing #200 sieve. The natural fine aggregates can include natural sand, crushed stone, soil, or other suitable fine particles, with most particles smaller than 4.75 mm.

Coarse aggregates used in embodiments of this disclosure can include crushed concrete demolition wastes with particles larger than 5 mm. In certain embodiments, the coarse aggregates can have particles in a size of up to 19 mm. In certain embodiments, the amount of coarse aggregate with a particle size greater than 9.5 mm can be 10% or less of the total amount of course and fine aggregates.

In other alternate embodiments, the aggregate can consist essentially of a fine aggregate that has a particle size of less than 4.75 mm and a coarse aggregate that has a particle size of greater than 5 mm, each of the fine aggregate and coarse aggregate obtained from concrete demolition waste.

Including a coarse aggregate in the controlled low strength material can increase the strength of the controlled low strength material. Therefore, by not including any coarse aggregate, the strength of the controlled low strength material can be maintained sufficiently low to allow for later excavation of the set controlled low strength material. However, in order to make non-excavatable controlled low strength material coarse aggregates from CDW may be used so as to meet the criteria that the strength is less than 8.3 MPa. In addition, plastic properties of the controlled low strength material in a fresh state, such as water demand and flowability, will be altered by including only fine aggregate, compared to a controlled low strength material that includes a coarse aggregate in addition to a fine aggregate. The water demand may increase in order to achieve a flowable controlled low strength material.

Figure 3:
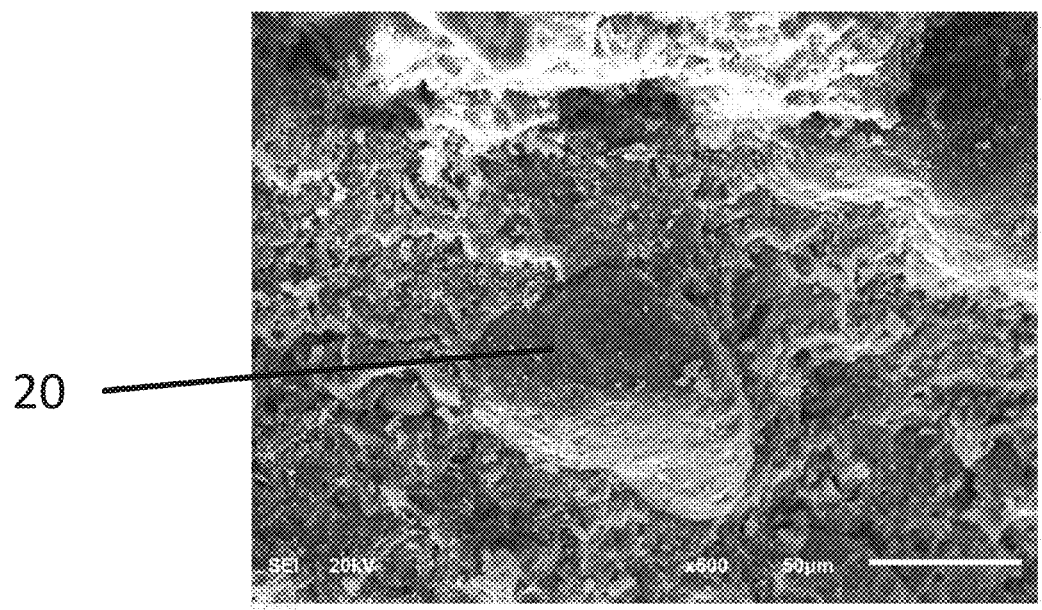
FIG. 3 is a scanning electron microscopy of an example of a concrete demolition wastes aggregate, in accordance with an embodiment of this disclosure, shown at a ×500 magnification of and a scale of 50 μm.
Figure 4:
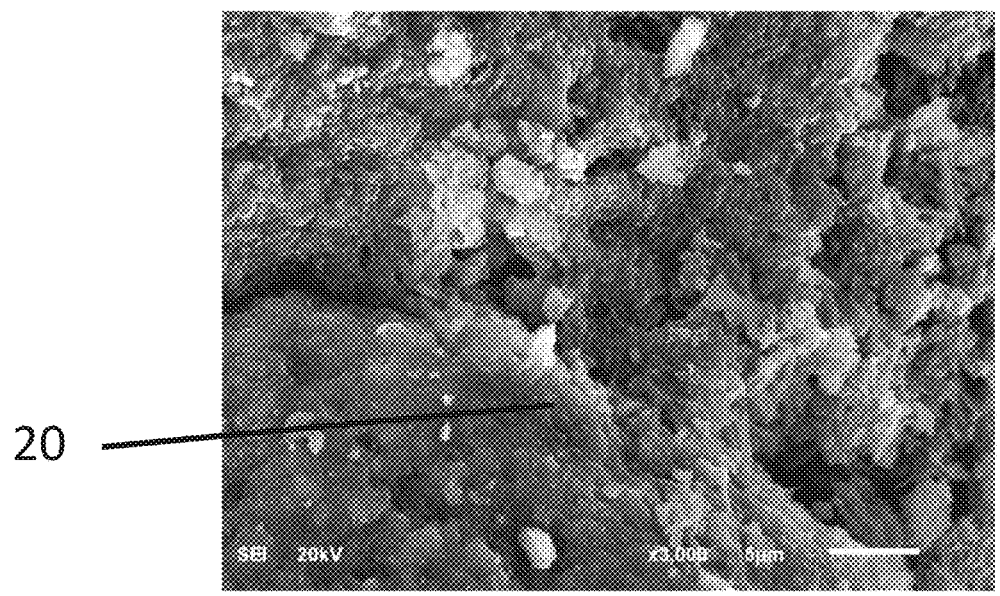
FIG. 4 is a scanning electron microscopy of an example of a concrete demolition wastes aggregate, in accordance with an embodiment of this disclosure, shown at a ×3000 magnification of and a scale of 5 μm.
Figure 5:
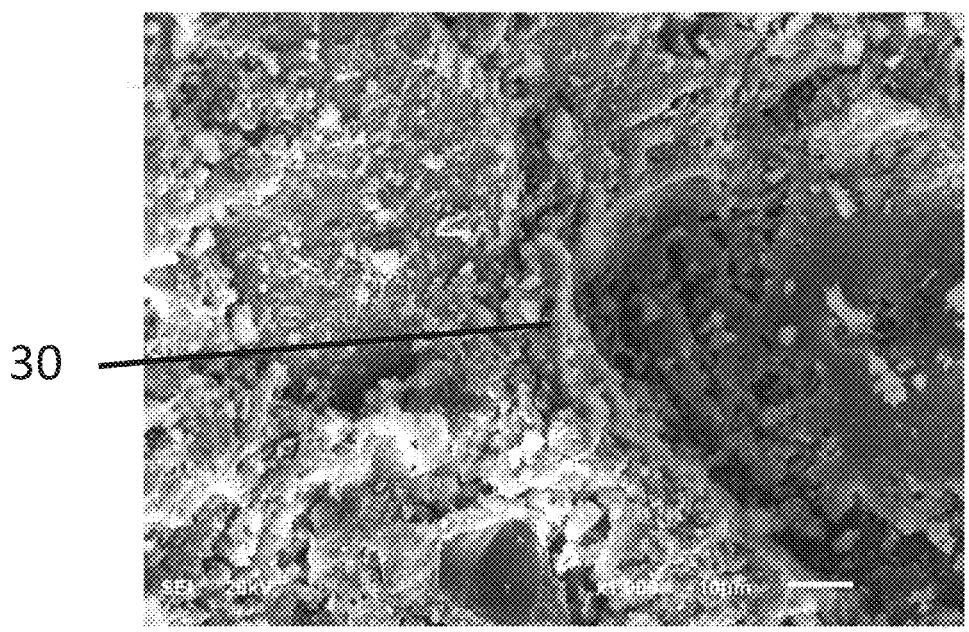
FIG. 5 is a scanning electron microscopy of an example of the interface of aggregate and paste, in accordance with an embodiment of this disclosure, shown at a ×1000 magnification of and a scale of 10 μm.

Looking at FIG. 3, an SEM image of concrete demolition wastes aggregates 20 is shown at ×500 magnification and a scale of 50 μm. Looking at FIG. 4, an SEM image of concrete demolition wastes aggregates (20) is shown at ×3000 magnification and a scale of 5 μm. Looking at FIG. 5, an SEM image of the interface of aggregate and paste 30 is shown is shown at ×1000 magnification and a scale of 10 μm. Results of EDS analysis at the interface shows the existence of calcium (Ca) in higher proportions (35.8%). Low quantities of silicon (Si) (6.5%), Iron (Fe) (1.3%), magnesium (Mg) 1.3%, aluminum (Al) 1.3%. were noted. The elements exist in the form of oxides.

Table 6 presents an example typical range of element oxides in the concrete demolition wastes aggregates determined by XRF method. The amounts of each of the elements of the composition in concrete demolition waste aggregates can vary depending upon the type of concrete used to form the concrete demolition waste.

TABLE 6

| Element | Element Weight, % (Range) |
| --- | --- |
| SiO2 | 30-55 |
| CaO | 18-37 |
| Al2O3 | 5-9 |
| Fe2O3 | 2.5-7.5 |

The Controlled Low Strength Material

In preparing a controlled low strength material, the range of wt % each of the constituents, which include a cement, an aggregate, a heavy oil fuel ash, and a water, can be found in Table 7. As used in Table 7, the unit wt % is measured relative to the weight of the controlled low strength material, except for the heavy oil fuel ash, which is measured relative to the weight of the sum of the cement and heavy old fuel ash.

In the embodiments of Table 7 of this disclosure, the aggregate includes as least some concrete demolition waste. The aggregate can include recycled fine aggregate, recycled coarse aggregate, or a combination of recycled fine aggregate and recycled coarse aggregate, together with or without a natural aggregate. In the embodiments of Table 7, the water is delivered to the mix separate from the heavy oil fuel ash.

TABLE 7

| Constituent | Range of Amount wt % |
| --- | --- |
| Cement | 2 to 5 |
| Aggregate (total coarse and fine) | 20 to 95 |
| Heavy oil fuel Ash (By weight of sum of cement and HOFA) | 10 to 50 |
| Water | 10 to 15 |

In preparing a controlled low strength material, the range of wt % each of the constituents, which include a cement, an aggregate, a heavy oil fuel ash, and a water, and where the heavy oil fuel ash is prepared in the form of a water-based slurry which is added directly to the cement and the aggregates, can be found in Table 8. As used in Table 8, the unit wt % is measured relative to the weight of the controlled low strength material, except for the heavy oil fuel ash, which is measured relative to the weight of the sum of the cement and the heavy oil fuel ash.

In the embodiments of Table 8 of this disclosure, the aggregate includes as least some concrete demolition waste. The aggregate can include recycled fine aggregate, recycled course aggregate, or a combination of recycled fine aggregate and recycled course aggregate, together with or without a natural aggregate. In the embodiments of Table 8, the water is delivered to the mix both as part of the slurry, and also added separately from the heavy oil fuel ash.

TABLE 8

| Constituent | Range of Amount wt % |
|---|---|
| Cement | 2 to 5 |
| Aggregate (total coarse and fine) | 20 to 95 |
| Heavy oil fuel Ash (By weight of sum of cement and HOFA) | 10 to 50 |
| Water | 10 to 20 |

In preparing an alternate controlled low strength material that can be a non-excavatable controlled low strength material, the range of wt % each of the constituents, which include a cement, an aggregate, and a water, can be found in Table 8. As used in Table 8, the unit wt % is measured relative to the weight of the controlled low strength material.

In the embodiments of Table 9 of this disclosure, the aggregate includes as least some concrete demolition waste. The aggregate can include recycled fine aggregate, recycled course aggregate, or a combination of recycled fine aggregate and recycled course aggregate, together with or without a natural aggregate.

TABLE 9

| Constituent | Range of Amount wt % |
|---|---|
| Cement | 2 to 5 |
| Aggregate (total coarse and fine) | 60 to 90 |
| Water | 10 to 20 |

Table 10 shows examples of typical mix design used for developing a controlled low strength material using ordinary Portland cement (OPC), natural fine aggregate (NFA), natural coarse aggregate (NCA), recycled fine aggregate (RFA), recycled course aggregate (RCA), and water. The total aggregate (TA) is the sum of the NFA, NCA, RFA, and RCA. The mixes M1 and M2 of Table 10 do not include heavy oil fuel ash or any recycled concrete aggregate and do not disclose embodiments of this disclosure, but are provided for comparison purposes.

TABLE 10

| Mix # | OPC, kg/m³ | Water, kg/m³ | FA/TA | CA/TA | NFA, kg/m³ | NCA, kg/m³ | RFA, kg/m³ | RCA, kg/m³ |
|---|---|---|---|---|---|---|---|---|
| M1 | 90 | 243 | 0.6 | 0.4 | 1126 | 751 | 0 | 0 |
| M2 | 100 | 200 | 0.5 | 0.5 | 991 | 991 | 0 | 0 |
| M3 | 100 | 250 | 0.6 | 0.4 | 0 | 0 | 1166 | 777 |

Table 11 shows examples of typical mix design used for developing a controlled low strength material mixes. In each of the mixes, the heavy oil fuel ash is in an amount of 30% of the total of the heavy oil fuel ash and ordinary Portland cement. Mix M4 does not include any recycled concrete aggregate. Mixes M5-M6 include recycled concrete aggregate and are example mixes of embodiments of this disclosure.

TABLE 11

| Mix # | HOFA % | OPC kg/m³ | HOFA kg/m³ | Water kg/m³ | NFA kg/m³ | NCA kg/m³ | RFA kg/m³ | RCA kg/m³ |
|---|---|---|---|---|---|---|---|---|
| M4 | 30% | 70 | 30 | 330 | 1077 | 718 | | |
| M5 | 30% | 70 | 30 | 330 | 1076 | 0 | 0 | 718 |
| M6 | 30% | 70 | 30 | 350 | 0 | 0 | 1055 | 703 |

Both water and cement are required to form a paste that can easily bind the aggregate. In certain embodiments, the controlled low strength material can be free of traditional fly ash, plasticizers, and fiber.

In alternate embodiments, the controlled low strength material can include a plasticizer or entrained air admixtures to achieve the desired consistency.

The controlled low strength material having both heavy oil fuel ash and a formed in accordance with embodiments of this disclosure has a compressive strength in a range of 300 kPa to 2.10 MPa for excavatable controlled low strength material, and a compressive strength in a range of 2.10 MPa to 8.3 MPa for non-excavatable controlled low strength material.

The controlled low strength material of M1-M6 in accordance with embodiments of this disclosure have a unit weight ranging from 1993-2050 kg/m³. Table 12 shows the example of unit weight for the mixes developed.

TABLE 12

| Mix | Mix Details | # | L, mm | W, mm | H, mm | Weight, gr | Unit Weight, kg/m³ | Avg Unit Weight, kg/m³ |
|---|---|---|---|---|---|---|---|---|
| M1 | 90 kg/m³ OPC + NFA + NCA | 1 | 51.3 | 50.2 | 52 | 272.3 | 2045 | 2048 |
| | | 2 | 50.3 | 50.7 | 51 | 266.7 | 2035 | |
| | | 3 | 51.3 | 50.7 | 52 | 279.3 | 2065 | |
| M2 | 100 kg/m³ OPC + NFA + NCA | 1 | 50.1 | 51.3 | 52 | 275.9 | 2064 | 2050 |
| | | 2 | 50.3 | 51.7 | 52 | 276.3 | 2047 | |
| | | 3 | 51.1 | 50.7 | 51 | 270.9 | 2038 | |
| M3 | 100 kg/m³ OPC + RFA + RCA | 1 | 50.5 | 52.3 | 52 | 280.2 | 2052 | 2074 |
| | | 2 | 50.3 | 51.2 | 52 | 277.9 | 2087 | |
| | | 3 | 50.3 | 51.2 | 52 | 277.3 | 2083 | |
| M4 | 30 kg/m³ HOFA + 70 kg/m³ OPC + NFA + NCA | 1 | 52.9 | 50 | 51 | 270.5 | 2013 | 2007 |
| | | 2 | 50.2 | 51.3 | 53 | 271.7 | 2002 | |
| | | 3 | 50.1 | 52.7 | 52 | 275.3 | 2005 | |
| M5 | 30 kg/m³ HOFA + 70 kg/m³ OPC + NFA + RFA | 1 | 51.3 | 50.2 | 52 | 266.9 | 2005 | 1998 |
| | | 2 | 50.3 | 51.3 | 51 | 266.3 | 2012 | |
| | | 3 | 51.3 | 50.7 | 52 | 266.9 | 1977 | |
| M6 | 30 kg/m³ HOFA+ 70 kg/m³ OPC + RFA + RCA | 1 | 51.3 | 50 | 51 | 262.3 | 2005 | 1993 |
| | | 2 | 50 | 51 | 50 | 255.2 | 1996 | |
| | | 3 | 51.3 | 51.5 | 50 | 263.8 | 1985 | |

The controlled low strength material formed in accordance with embodiments of this disclosure can be self-consolidating or flowable fill. When tested in accordance with ASTM D6103 Test Method for Flow Consistency of Controlled Low Strength Material, an open-ended cylinder is placed on a flat, level surface and filled with fresh controlled low strength material. The cylinder is then raised quickly so that the controlled low strength material will flow into a patty. The average diameter of the patty is measured. When tested in accordance with ASTM D6103 Test Method for Flow Consistency of Controlled Low Strength Material, the controlled low strength material of embodiments of this disclosure can provide a patty with an average diameter between 197 mm and 206 mm without any segregation. Table 13 shows an example of the flowability achieved for CLSM mixes made with OPC only and OPC replaced by HOFA and natural coarse and fine aggregates replaced by recycled coarse and fine aggregates obtained from concrete demolition wastes.

The controlled low strength material with HOFA formed in accordance with embodiments of this disclosure is a highly flowable mix. The spherical particles of HOFA with 90-95% carbon aids in the making a self-consolidating CLSM mix with high flowability. As per ASTM D6103, the flowability of the CLSM mix should be in the range of 200-300 mm.

TABLE 13

| Mix # | Mix Details | Water kg/m³ | Flow of concrete, cm | | | | |
|---|---|---|---|---|---|---|---|
| | | | 1 | 2 | 3 | 4 | Avg. |
| M1 | 90 kg/m³ OPC + NFA + NCA | 243 | 197 | 199 | 190 | 195 | 197 |
| M2 | 100 kg/m³ OPC + NFA + NCA | 200 | 197 | 202 | 203 | 198 | 200 |
| M3 | 100 kg/m³ OPC + RFA + RCA | 250 | 207 | 206 | 203 | 205 | 205 |
| M4 | 30 kg/m³ HOFA + 70 kg/m³ OPC + NFA + NCA | 330 | 207 | 205 | 204 | 206 | 206 |
| M5 | 30 kg/m³ HOFA + 70 kg/m³ OPC + NFA + RCA | 330 | 204 | 203 | 203 | 201 | 203 |
| M6 | 30 kg/m³ HOFA + 70 kg/m³ OPC + RFA + RCA | 350 | 201 | 201 | 203 | 205 | 203 |

The controlled low strength material with heavy oil fuel ash and recycled coarse and fine aggregates obtained from concrete demolition wastes, formed in accordance with embodiments of this disclosure shows no bleeding or segregation in spite of the large quantity of the water used. Excessive bleeding will result in segregation of the aggregates, which inhibits the flowability of the controlled low strength material mixes. The porous heavy oil fuel ash particles in this embodiments act as micro sponges which requires a lot of water, but which also holds water, preventing any bleeding. Although there are no current norms specifying the limits on bleeding water, for practical limits the bleeding rate should be limited to 5% for the bleeding tests conducted using ASTM C232/232M-14 (2014).

Table 14 shows for example the compressive strength of the controlled low strength material mixes at ages of 2, 3, 7 and 28 days. For controlled low strength material mixes with ordinary Portland cement, and no heavy oil fuel ash, it can be seen that the strength at an early age (2 days) is substantially higher than 300 kPa. The compressive strength of material mixes with ordinary Portland cement increases with age to about 3.5 to 4.5 MPa at 7 days. However, no further significant increase is observed in the compressive strength at 28 days. The higher compressive strength in the ordinary Portland cement only controlled low strength material mixes make it a non-excavatable controlled low strength material.

Table 14 shows that controlled low strength material mixes with the heavy oil fuel ash in an amount of 30% of the total of the heavy oil fuel ash and ordinary Portland cement (Mixes M4-M6) meet the criteria for an excavatable controlled low strength material. The compressive strength of mixes M5 and M6, which contain both heavy oil fuel ash and a recycled concrete aggregate ranges from 400 kPa to 1.05 MPa at 2 days. The rate of strength gain for mixes M5 and M6 is slow and it increases ranging from to 1.23 MPa to 1.77 MPa at 7 days. The long-term strength gain of mixes M5 and M6 is not excessive and the developed controlled low strength material has a strength range of 2.01 MPa to 2.10 MPa at 28 days. The higher compressive strength of certain embodiments make it suitable for non-excavatable controlled low strength material. This non-excavatable controlled low strength material can be used, for example, for lean concrete under foundations, as well as for other applications.

TABLE 14

| Mix | Mix Details | # | 2 days | | | 3 days | | |
|---|---|---|---|---|---|---|---|---|
| | | | Load, kN | Comp Strength, MPa | Avg Str, MPa | Load, kN | Comp Strength, MPa | Avg Str, MPa |
| M1 | OPC + NFA + NCA | 1 | 2.5 | 1 | 0.92 | 3.5 | 1.4 | 1.28 |
| | | 2 | 2.3 | 0.92 | | 3.2 | 1.28 | |
| | | 3 | 2.1 | 0.84 | | 2.9 | 1.16 | |
| M2 | 100 kg/m³ of OPC (50% CA + 50% FA) + NFA + NCA | 1 | 5.9 | 2.36 | 2.60 | 8.7 | 3.48 | 3.40 |
| | | 2 | 6.7 | 2.68 | | 8 | 3.2 | |
| | | 3 | 6.9 | 2.76 | | 8.8 | 3.52 | |
| M3 | 100 kg/m³ of OPC (40% CA + 60% FA) + RFA + RCA | 1 | 5.5 | 2.2 | 2.48 | 9.1 | 3.64 | 3.57 |
| | | 2 | 6.3 | 2.52 | | 8.8 | 3.52 | |
| | | 3 | 6.8 | 2.72 | | 8.9 | 3.56 | |
| M4 | 30 kg/m³ HOFA + 70 kg/m³ OPC + NFA + NCA | 1 | 0.7 | 0.28 | 0.28 | 1.2 | 0.48 | 0.57 |
| | | 2 | 0.7 | 0.28 | | 1.3 | 0.52 | |
| | | 3 | 0.7 | 0.28 | | 1.8 | 0.72 | |
| M5 | 30 kg/m³ HOFA + 70 kg/m³ OPC + NFA + RCA | 1 | 1 | 0.4 | 0.40 | 3.1 | 1.24 | 1.19 |
| | | 2 | 1.1 | 0.44 | | 2.9 | 1.16 | |
| | | 3 | 0.9 | 0.36 | | 2.9 | 1.16 | |
| M6 | 30 kg/m³ HOFA + 70 kg/m³ OPC + RFA + RCA | 1 | 2.9 | 1.16 | 1.05 | 3.6 | 1.44 | 1.23 |
| | | 2 | 2.5 | 1.00 | | 3 | 1.2 | |
| | | 3 | 2.5 | 1.00 | | 2.6 | 1.04 | |

TABLE 14-continued

| Mix | Mix Details | Load, # | 7 days Load, kN | 7 days Comp Strength, MPa | 7 days Avg Str, MPa | 28 days Load kN | 28 days Comp Strength, MPa | 28 days Avg Strength, MPa |
|---|---|---|---|---|---|---|---|---|
| M1 | OPC + NFA + NCA | 1 | 8.8 | 3.52 | 3.53 | 9.2 | 3.68 | 3.60 |
|    |                 | 2 | 8.7 | 3.48 |      | 9   | 3.6  |      |
|    |                 | 3 | 9   | 3.6  |      | 8.8 | 3.52 |      |
| M2 | 100 kg/m³ of OPC (50% CA + 50% FA) + NFA + NCA | 1 | 9.9  | 3.96 | 4.24 | 11.3 | 4.52 | 4.36 |
|    |                                                 | 2 | 10.8 | 4.32 |      | 10.3 | 4.12 |      |
|    |                                                 | 3 | 11.1 | 4.44 |      | 11.1 | 4.44 |      |
| M3 | 100 kg/m³ of OPC (40% CA + 60% FA) + RFA + RCA | 1 | 11.9 | 4.76 | 4.49 | 10.1 | 4.04 | 4.56 |
|    |                                                 | 2 | 10.3 | 4.12 |      | 12.8 | 5.12 |      |
|    |                                                 | 3 | 11.5 | 4.6  |      | 11.3 | 4.52 |      |
| M4 | 30 kg/m³ HOFA + 70 kg/m³ OPC + NFA+NCA | 1 | 1.9 | 0.76 | 0.72 | 4.4 | 1.76 | 1.85 |
|    |                                         | 2 | 1.7 | 0.68 |      | 4.7 | 1.88 |      |
|    |                                         | 3 | 1.8 | 0.72 |      | 4.8 | 1.92 |      |
| M5 | 30 kg/m³ HOFA + 70 kg/m³ OPC + NFA + RCA | 1 | 2.8 | 1.12 | 1.23 | 5.6 | 2.24 | 2.01 |
|    |                                           | 2 | 3.5 | 1.4  |      | 5.1 | 2.04 |      |
|    |                                           | 3 | 2.9 | 1.16 |      | 4.4 | 1.76 |      |
| M6 | 30 kg/m³ HOFA + 70 kg/m³ OPC + RFA + RCA | 1 | 4.8 | 1.92 | 1.77 | 5.5 | 2.2  | 2.15 |
|    |                                           | 2 | 4.2 | 1.68 |      | 5.2 | 2.08 |      |
|    |                                           | 3 | 4.3 | 1.72 |      | 5.4 | 2.16 |      |

In order to form the controlled low strength material, the constituents of the controlled low strength material can be batched in stationary concrete batch plants in general conformance with ASTM C94, or mixed in mobile volumetric mixing plants in accordance with ASTM C685. In each case, there may be necessary adjustment or modifications to the plant fixtures or process to allow for introducing the heavy oil fuel ash in an accurately measured amounts.

It is found that the recycled concrete aggregates behaved as pozzolanic materials as the concrete strength in mixes where recycled concrete aggregates are used found to be higher in strength than the mix where natural aggregates are used. The analysis of the recycled concrete aggregates shows SiO2 is in the range of 30-55%, which confirms the pozzolan nature of the aggregate.

The heavy oil fuel ash can be combined with cement, natural coarse and fine aggregates, and coarse and fine aggregates obtained from concrete demolition wastes or a mix of any aggregates and water, to produce the flowing controlled low strength material to be used in lieu of soil backfill for cavities or trenches without the need for compaction or added consolidation.

Embodiments of this disclosure, therefore, are well adapted to carry out the objects and attain the ends and advantages mentioned, as well as others that are inherent. While embodiments of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A controlled low strength material, constituents of the controlled low strength material including:
   a cement, the cement in an amount of 2 wt % to 5 wt % of the constituents of the controlled low strength material;
   a heavy oil fuel ash in an amount of 10 wt % to 50 wt % of the sum of the cement and the heavy oil fuel ash;
   an aggregate, where the aggregate includes concrete demolition waste, the aggregate in an amount of 20 wt % to 95 wt % of the constituents of the controlled low strength material; and
   a water, the water in an amount of 10 wt % to 20 wt % of the constituents of the controlled low strength material;
   where
   the controlled low strength material has a compressive strength that does not exceed 8.3 MPa, measured at 28 days.

2. The controlled low strength material of claim 1, where the controlled low strength material has a compressive strength that does not exceed 2.10 MPa, measured at 28 days.

3. The controlled low strength material of claim 1, where the heavy oil fuel ash includes carbon in an amount of 90 wt % to 95 wt % based on a weight of heavy oil fuel ash.

4. The controlled low strength material of claim 1, where at least 80% of the heavy oil fuel ash has a particle size smaller than 45 micrometers.

5. The controlled low strength material of claim 1, where an amount of aggregate with a particle size greater than 9.5 mm is 10% or less of the amount of aggregate.

6. The controlled low strength material of claim 1, where the aggregate includes a fine aggregate formed of a concrete demolition waste that has a particle size less than 4.75 mm, and a coarse aggregate.

7. The controlled low strength material of claim 1, where the aggregate includes a fine aggregate formed of a concrete demolition waste that has a particle size less than 4.75 mm, and a coarse aggregate formed of a concrete demolition waste that has a particle size larger than 5 mm.

8. The controlled low strength material of claim 7, where the coarse aggregate has a particle size up to 19 mm.

9. A method for forming a controlled low strength material, the method including:
   mixing together constituents that include:
      a cement, the cement in an amount of 2 wt % to 5 wt % of the constituents of the controlled low strength material;
      a heavy oil fuel ash in an amount of 10 wt % to 50 wt % of the sum of the cement and the heavy oil fuel ash;
      an aggregate, where the aggregate includes concrete demolition waste, the aggregate in an amount of 20 wt % to 95 wt % of the constituents of the controlled low strength material; and a water, the water in an amount of 10 wt % to 20 wt % of the constituents of the controlled low strength material; where after mixing, the controlled low strength material has a compressive strength that does not exceed 8.3 MPa, measured at 28 days.

10. The method of claim 9, such that after mixing, the controlled low strength material has a compressive strength that does not exceed 2.10 MPa, measured at 28 days.

11. The method of claim 9, where the heavy oil fuel ash includes carbon in an amount of 90 wt % to 95 wt % based on a weight of heavy oil fuel ash.

12. The method of claim 9, where at least 80% of the heavy oil fuel ash has a particle size smaller than 45 micrometers.

13. The method of claim 9, where an amount of aggregate with a particle size greater than 9.5 mm is 10% or less of the amount of aggregate.

14. The method of claim 9, where the aggregate includes a fine aggregate formed of a concrete demolition waste that has a particle size less than 4.75 mm, and a coarse aggregate.

15. The method of claim 9, where the aggregate includes a fine aggregate, and a coarse aggregate formed of a concrete demolition waste that has a particle size larger than 5 mm.

16. The method of claim 15, where the coarse aggregate has a particle size up to 19 mm.

17. The method of claim 9, where the heavy oil fuel ash is part of a heavy oil fuel ash slurry that includes the heavy oil fuel ash and a slurry water, the method further including adding the heavy oil fuel ash slurry directly to the cement and the aggregate to produce the controlled low strength material.

18. The method of claim 17, where the slurry water and the mixing water together are in an amount of 10 wt % to 20 wt % of the constituents of the controlled low strength material.

* * * * *